(12) United States Patent
Nagasaki

(10) Patent No.: US 10,768,864 B2
(45) Date of Patent: Sep. 8, 2020

(54) SERVER STORES AND DETERMINES PRINT OUTPUT FORMAT AND ACCOUNT INFORMATION REPRESNTING REMAINING BALANCE AMOUNT SPENDABLE BY USER FOR PRINTING PROCESS

(71) Applicant: BROTHER KOGYO KABUSHIKI KAISHA, Nagoya-shi, Aichi-ken (JP)

(72) Inventor: Takeshi Nagasaki, Nagoya (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/904,525

(22) Filed: Feb. 26, 2018

(65) Prior Publication Data

US 2018/0246682 A1 Aug. 30, 2018

(30) Foreign Application Priority Data

Feb. 27, 2017 (JP) .................................. 2017-035562

(51) Int. Cl.
*G06F 3/12* (2006.01)
*H04N 1/23* (2006.01)
*H04N 1/00* (2006.01)

(52) U.S. Cl.
CPC .......... *G06F 3/1203* (2013.01); *G06F 3/1204* (2013.01); *G06F 3/1239* (2013.01);
(Continued)

(58) Field of Classification Search
None
See application file for complete search history.

(56) References Cited

U.S. PATENT DOCUMENTS

2007/0035763 A1* 2/2007 Bard ..................... G06F 3/1222
358/1.15
2010/0067036 A1* 3/2010 Oka ....................... G06Q 10/00
358/1.14

(Continued)

FOREIGN PATENT DOCUMENTS

JP 2011-186691 A 9/2011

*Primary Examiner* — Benny Q Tieu
*Assistant Examiner* — Haris Sabah
(74) *Attorney, Agent, or Firm* — Scully, Scott, Murphy & Presser, P.C.

(57) ABSTRACT

A server includes memory storing management information including: first correspondence information representing correspondence between an output format for printing process and price for the printing process based on the output format; and second correspondence information representing correspondence between an account information of a user and balance spendable by the user and a controller configured to perform: receiving a printing request using an account information item; determining whether an object price is equal to or less than an object balance; if the object price is more than the object balance, extracting candidate output format that is different from the object output format and usable to perform a printing process based on the printing request within the object balance, with reference to the first correspondence information; and transmitting information representing the extracted candidate output format to an external device.

10 Claims, 8 Drawing Sheets

(52) U.S. Cl.
CPC .......... *G06F 3/1268* (2013.01); *G06F 3/1288* (2013.01); *G06F 3/1255* (2013.01); *G06F 2206/1504* (2013.01); *G06F 2206/1506* (2013.01); *H04N 1/00148* (2013.01); *H04N 1/2369* (2013.01)

(56) References Cited

U.S. PATENT DOCUMENTS

2012/0147412 A1\* 6/2012 Tsujimoto .......... H04N 1/00244
358/1.14
2013/0057884 A1\* 3/2013 Sasaki .................... G06K 15/02
358/1.9

\* cited by examiner

FIG. 2A

138                              PRICE / 1PAGE

| SHEET SIZE | PRINT QUALITY | MONOCHROME | | COLOR | |
|---|---|---|---|---|---|
| | | SINGLE-SIDED | DOUBLE-SIDED | SINGLE-SIDED | DOUBLE-SIDED |
| A4 | HIGH QUALITY | 0.15 | 0.11 | 0.45 | 0.33 |
| | NORMAL | 0.10 | 0.07 | 0.30 | 0.21 |
| | TONER SAVING | 0.06 | 0.04 | 0.18 | 0.12 |
| LETTER | HIGH QUALITY | 0.15 | 0.11 | 0.45 | 0.33 |
| | NORMAL | 0.10 | 0.07 | 0.30 | 0.21 |
| | TONER SAVING | 0.06 | 0.04 | 0.18 | 0.12 |
| A5 | HIGH QUALITY | 0.08 | 0.06 | 0.24 | 0.18 |
| | NORMAL | 0.60 | 0.04 | 0.18 | 0.12 |
| | TONER SAVING | 0.04 | 0.03 | 0.12 | 0.09 |
| L SIZE | HIGH QUALITY | 0.08 | 0.06 | 0.24 | 0.18 |
| | NORMAL | 0.60 | 0.04 | 0.18 | 0.12 |
| | TONER SAVING | 0.04 | 0.03 | 0.12 | 0.09 |

| ACCOUNT (AUTHENTICATION ID) | SUM OF AVAILABLE MONEY | SUM OF CHARGED PRICES | BALANCE |
|---|---|---|---|
| USER 1 | 100.0 | 23.8 | 76.2 |
| USER 2 | 100.0 | 50.3 | 49.7 |
| USER 3 | 50.0 | 21.3 | 28.7 |
| ... | ... | ... | ... |

FIG. 2C

| ACCOUNT (AUTHENTICATION ID) | PREDETERMINED OUTPUT FORMAT | USABLE OUTPUT FORMAT | | | | | | | | | |
|---|---|---|---|---|---|---|---|---|---|---|---|
| | | PRINT QUALITY | | | COLOR/ MONOCHROME | | SINGLE-SIDED/ DOUBLE-SIDED | | N IN 1 | | |
| | | HIGH QUALITY | NORMAL | TONER SAVING | COLOR | MONOCHROME | SINGLE-SIDED | DOUBLE-SIDED | 1 IN 1 | 2 IN 1 | 4 IN 1 |
| USER 1 | NORMAL MONOCHROME SINGLE-SIDED 1 IN 1 | ◯ | ◯ | ◯ | ◯ | ◯ | ◯ | ◯ | ◯ | ◯ | ◯ |
| USER 2 | NORMAL MONOCHROME SINGLE-SIDED 1 IN 1 | | ◯ | ◯ | ◯ | ◯ | ◯ | ◯ | ◯ | ◯ | ◯ |
| USER 3 | TONER SAVING MONOCHROME DOUBLE-SIDED 2 IN 1 | | | ◯ | | ◯ | | ◯ | ◯ | ◯ | ◯ |
| ... | ... | ... | ... | ... | ... | ... | ... | ... | ... | ... | ... |

SERVER STORES AND DETERMINES PRINT OUTPUT FORMAT AND ACCOUNT INFORMATION REPRESNTING REMAINING BALANCE AMOUNT SPENDABLE BY USER FOR PRINTING PROCESS

CROSS-REFERENCE TO RELATED APPLICATION

This application claims priority from Japanese Patent Application No. 2017-035562 filed on Feb. 27, 2017, the entire subject-matter of which is incorporated herein by reference.

TECHNICAL FIELD

The disclosure relates to a technology for managing printing.

BACKGROUND

The have been proposed various technologies in which a plurality of users uses a printer through a network. For example, the following technology has been proposed. A server manages the maximum number of printable pages and a threshold, for each of identification numbers identifying users. Also, the server manages the printing history of each identification number using information from a printer having performed printing. In the case where the printer newly performs printing, if the number of printed pages exceeds the product of the threshold and the maximum number of printable pages, the server determines that it is impossible to perform printing. In the case where it is determined that it is impossible to perform printing, a personal computer selects a printing option (such as 1-UP, 2-UP, or 4-UP) usable to perform printing within the maximum number of printable pages.

SUMMARY

Illustrative aspects of the disclosure provide a server connectable to a network, the server comprising: memory storing management information, the management information comprising: first correspondence information representing correspondence between an information item representing an output format for printing process and an information item representing price for the printing process based on the output format; and second correspondence information representing correspondence between an account information item specifying a user and an information item representing balance spendable by the specified user; and a controller configured to perform: receiving a printing request using an account information item; determining whether an object price is equal to or less than an object balance, the object price being a price for performing a printing process based on the printing request according to an object output format corresponding to the printing request, the object balance being a balance included in the second correspondence information in association with an object account information item corresponding to the printing request; in a case where it is determined that the object price is equal to or less than the object balance, updating the second correspondence information such that the balance associated with the object account information item represents a value obtained by subtracting the object price from the object balance; in a case where it is determined that the object price is more than the object balance, extracting candidate output format with reference to the first correspondence information, the candidate output format being different from the object output format and being usable to perform a printing process based on the printing request within the object balance; and transmitting, to an external device connected to the network, information representing the extracted candidate output format.

According thereto, in the case where the object price is more than the object balance, information representing the candidate output format usable to perform the printing process at a price within the object balance is transmitted to the external device. Therefore, it is possible to propose printing at a price within the object balance.

The technology according to the disclosure can be implemented in various modes, such as a data processing method of a server, a server, a system including a server and a printer, computer programs for implementing the data processing method and the functions of the servers, the printer, and the system, and recording media (for example, non-transitory computer-readable recording medium) storing the computer program.

BRIEF DESCRIPTION OF THE DRAWINGS

FIGS. 2A to 2C are explanatory views illustrating an example of a reference price table 138, an example of a usage state table 139, and an example of an output format table 140, respectively;

DETAILED DESCRIPTION

In printing processes, color materials, sheets, and the like are used according to the contents of the printing processes. Therefore, the prices for printing processes depend on the contents of the printing processes. There is some room for devising a technology for managing printing in view of prices for printing processes.

This disclosure discloses a technology capable of managing printing in view of costs of printing processes.

Figure 1:
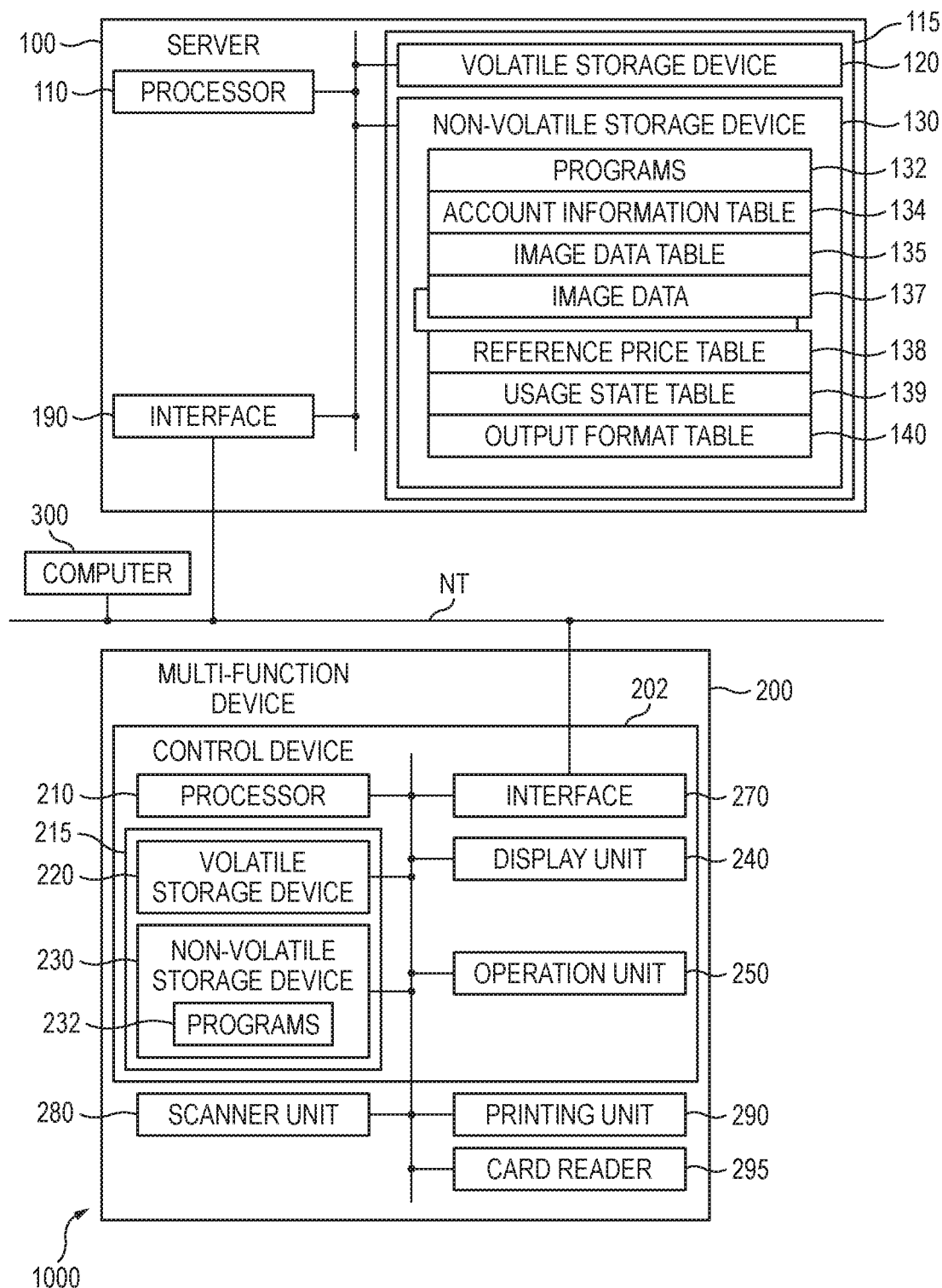
FIG. 1 is an explanatory view illustrating an image processing system as an illustrative embodiment.

FIG. 1 is an explanatory view illustrating an image processing system as an illustrative embodiment. The image processing system includes a server 100, a multi-function device 200, and a computer 300. These devices 100, 200, and 300 are connected to a network NT, such that they can perform communication with one another. Also, a system 1000 including the server 100 and the multi-function device 200 is a printing system for printing images using image data, which will be described below.

The server 100 is a device including a computer. In the present illustrative embodiment, the server 100 has a processor 110, a storage device 115, and an interface 190. These elements are connected to one another via a bus. The storage device 115 includes a volatile storage device 120 and a non-volatile storage device 130.

The processor 110 is a device for performing data processing, and is, for example, a CPU. The volatile storage device 120 is, for example, a DRAM, and the non-volatile storage device 130 is, for example, a hard disk drive. The non-volatile storage device 130 retains programs 132, an account information table 134, an image data table 135, image data 137, a reference price table 138, a usage state table 139, and an output format table 140. The processor 110 executes the programs 132, thereby performing processes of obtaining image data for printing, from a terminal (for example, the computer 300) connected to the network NT and supplying the obtained image data to the multi-function device 200 such that the multi-function device 200 prints images. In order to perform these processes, the processor 110 performs authentication based on the account information table 134, which will be described below in detail. If authentication succeeds, the processor 110 allows uploading of image data into the server 100, and allows supply of image data to the multi-function device 200. Further, the processor 110 can determine an output format for printing such that printing can be performed within a sum of available money associated with the authenticated account information. The processor 110 temporarily stores a variety of intermediate data to be used to execute the programs 132, in the storage device 115 (for example, one of the volatile storage device 120 and the non-volatile storage device 130).

The interface 190 is an interface for performing communication with other devices (for example, a wired LAN interface or a wireless interface of IEEE 802.11). In the present illustrative embodiment, the interface 190 is a wired or wireless network interface, and is connected to the network NT.

The multi-function device 200 is an example of a printer, and includes a control device 202, a scanner unit 280, a printing unit 290, and a card reader 295. The control device 202 has a processor 210, a storage device 215, a display unit 240, an operation unit 250 for receiving user's operations, and a communication interface 270. These elements are connected to one another via a bus. The storage device 215 includes a volatile storage device 220 and a non-volatile storage device 230.

The processor 210 is a device for performing data processing, and is, for example, a CPU. The volatile storage device 220 is, for example, a DRAM, and the non-volatile storage device 230 is, for example, a flash memory. The non-volatile storage device 230 retains programs 232. The processor 210 executes the programs 232, thereby performing processes of obtaining image data from the server 100 and controlling the printing unit 290 such that the printing unit prints images according to the obtained image data, which will be described below in detail. Also, the processor 210 may perform a process of making a user select an output format for printing, using information from the server 100. The processor 210 temporarily stores a variety of intermediate data to be used to execute the programs 232, in the storage device 215 (for example, one of the volatile storage device 220 and the non-volatile storage device 230). In the present illustrative embodiment, the programs 232 are stored as firmware in the non-volatile storage device 230 in advance, for example, by the manufacturer of the multi-function device 200. However, the multi-function device 200 may be configured such that at least a part of the programs 232 can be obtained from an external device (for example, a server) and be stored in the non-volatile storage device 230.

The display unit 240 is a device for displaying images, and is, for example, a liquid crystal display. The operation unit 250 is a device for receiving user's operations, and is, for example, a touch panel superimposed on the display unit 240. The user can input various instructions to the multi-function device 200 by operating the operation unit 250.

The interface 270 is an interface for performing communication with other devices (for example, a USB interface, a wired LAN interface, or a wireless interface of IEEE 802.11). In the present illustrative embodiment, the interface 270 is a wired or wireless network interface, and is connected to the network NT.

The scanner unit 280 optically reads objects such as documents, using photoelectric conversion elements such as CCDs and CMOSs, and generates scan data representing the read images (referred to as scanned images).

The printing unit 290 is a device for printing images on sheets (an example of print media) in a predetermined scheme (for example, a laser scheme or an inkjet scheme). In the present illustrative embodiment, the printing unit 290 is a laser printing device capable of printing color images with cyan (C), magenta (M), yellow (Y), and black (K) toner.

The card reader 295 is a device for reading out data recorded on cards such as IC cards in a contract or contactless scheme. In the present illustrative embodiment, the card reader 295 is a device for obtaining data from cards by wireless communication within a relatively short distance, such as NFC (Near Field Communication) or Bluetooth (registered as a trade mark).

The computer 300 is a device usable to transmit image data for printing to the server 100, and is, for example, a desktop computer or a tablet computer. The computer 300 includes a processor, a volatile storage device, a non-volatile storage device, and an interface for accessing the network NT (not shown in the drawings).

FIG. 2A is an explanatory view illustrating an example of the reference price table 138, and FIG. 2B is an explanatory view illustrating an example of the usage state table 139, and FIG. 2C is an explanatory view illustrating an example of the output format table 140. Hereinafter, these tables 138, 139, and 140 will be sequentially described.

The reference price table 138 (FIG. 2A) represents the correspondence between a plurality of output formats usable in printing processes using the multi-function device 200 and printing prices per page (for example, in dollar). In the present illustrative embodiment, each of the output formats is represented by a combination of the following five items: "SHEET SIZE" (in the present illustrative embodiment, one of options "A4", "LETTER", "A5", and "L"), "PRINT QUALITY" (in the present illustrative embodiment, one of options "NORMAL", "HIGH QUALITY", and "TONER SAVING"), "COLOR MODE" (in the present illustrative embodiment, one of options "COLOR PRINTING" and "MONOCHROME PRINTING"), "PRINT SIDE" (in the present illustrative embodiment, one of options "SINGLE-SIDED PRINTING" and "DOUBLE-SIDED PRINTING"), and "PAGE LAYOUT" (in the present illustrative embodiment, one of options "1 in 1" and "N in 1").

The item "SHEET SIZE" represents the size of sheets to be used in printing. The item "PRINT QUALITY" represents the quality of printed images. The option "NORMAL" represents an output format for printing images at average image quality. The option "HIGH QUALITY" represents an output format capable of representing high-chroma colors using sufficient amounts of color materials (here, toner). The option "TONER SAVING" represents an output format using color materials less than average to save color materials. The item "COLOR MODE" represents one of the options "COLOR PRINTING" and the "MONOCHROME PRINTING", and the item "PRINT SIDE" represents one of the options "SINGLE-SIDED PRINTING" and "DOUBLE-SIDED PRINTING". In the item "PAGE LAYOUT", the option "N in 1" represents an output format for printing the image of one page on one page. The option "N in 1" represents an output format for printing N-number of images of N-number of pages (wherein N is an integer of 2 or greater) on a single page. In the present illustrative embodiment, N can be selected from 2 and 4.

The reference price table 138 of FIG. 2A represents the correspondence between the combinations of four items "SHEET SIZE", "PRINT QUALITY", "COLOR MODE", and "PRINT SIDE" and printing prices per page. As shown in FIG. 2A, the printing price per page are in proportion to the sheet size, the print quality, and the printing price per page for color printing is higher than that for monochrome printing, and the printing price per page for single-side printing is higher than that for double-sided printing. In the case where the option "N in 1" is used as the item "PAGE LAYOUT", the price for a process of printing N-number of images of N-number of pages on the single page is the same as the printing price per page determined by the reference price table 138. The reference price table 138 is determined in advance by a manager managing account information.

The usage state table 139 (FIG. 2B) represents the correspondence among account information items (authentication IDs), sums of available money, sums of charged prices, and balances. A sum of available money is determined for each account information item. In the present illustrative embodiment, a sum of available money is a sum of money usable for one month. The processor 110 resets sums of available money associated with account information items in advance, on the same day of each month (for instance the first day). A sum of charged prices is a sum of prices charged for printing processes. Whenever a printing process is performed, the processor 110 updates a sum of charged prices, and when resetting sums of available money, the processor resets sums of charged prices to zero. A balance represents a sum of available money (e.g., spendable money) at that moment, and is a remainder obtained when a sum of charged prices is subtracted from a sum of available money.

The output format table 140 (FIG. 2C) represents the correspondence among account information items (authentication IDs), predetermined output formats, and usable output formats. In FIG. 2C, usable output formats are denoted by circles. A first account information item 141a is associated with a first output format group 141b, and a second account information item 142a is associated with a second output format group 142b, and a third account information item 143a is associated with a third output format group 143b. There is no limit to sheet size. However, for each account information item, a usable sheet size may be determined in advance.

In the present illustrative embodiment, in the case where a balance is sufficient, a printing process is performed in a predetermined output format. In the case where a balance is insufficient, the server 100 proposes an output format usable to print all pages within the balance.

Figure 3:
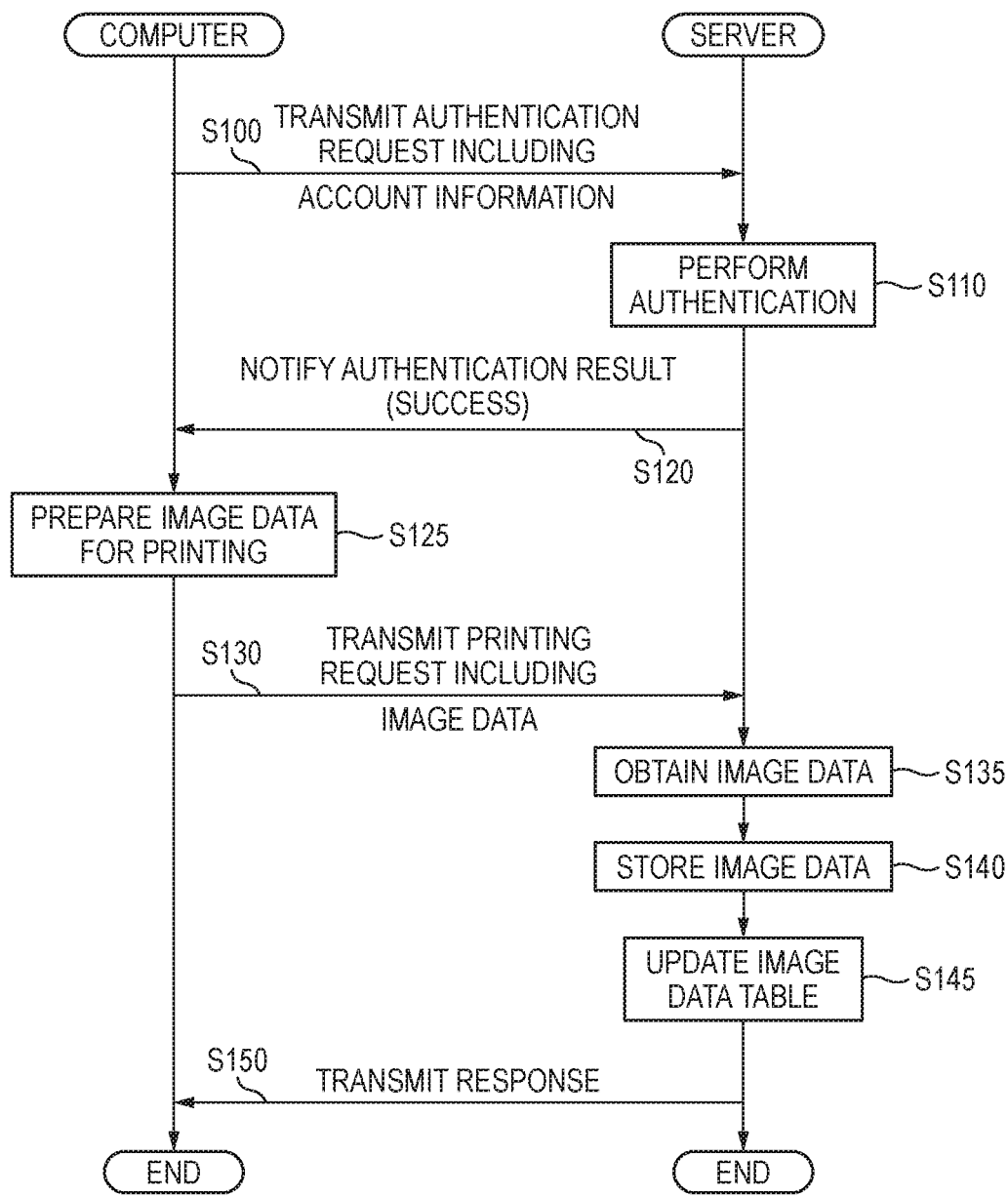
FIG. 3 is a sequence diagram illustrating an example of a process of uploading image data for printing into a server 100.

FIG. 3 is a sequence diagram illustrating an example of a process of uploading image data for printing into the server 100. The example of FIG. 3 shows the case where the computer 300 transmits image data to the server 100 in response to a user's instruction.

In S100, in response to a user's instruction, the computer 300 transmits account information for authentication to the server 100. For example, the processor 110 of the server 100 operates as a Web server supplying a login screen for inputting account information. A user inputs account information to the login screen of the server 100 by operating a WEB browser operating on the computer 300. Account information is information identifying a user permitted to use the server 100. In the present illustrative embodiment, as account information, an authentication ID is input. Also, for authentication, a password is input. The computer 300 transmits the input authentication ID and the input password to the server 100.

In S110, the processor 110 of the server 100 performs authentication on the account information received in S100, with reference to the account information table 134 (FIG. 1). Although not shown in the drawings, in the present illustrative embodiment, the account information table 134 represents the correspondence between authentication IDs and passwords for authentication. Information of the account information table 134 is determined in advance by the manager managing account information In S110 of FIG. 3, in a case where the authentication ID received from the computer 300 is registered in the account information table 134 and the password received from the computer 300 coincides with a password registered in association with the authentication ID in the account information table 134, the processor 110 of the server 100 determines that authentication has succeeded. Although not shown in the drawings, if authentication fails (the authentication ID is not registered or the password is incorrect), the processor 110 notifies authentication failure to the computer 300, and finishes the process. Hereinafter, on the assumption that authentication has succeeded, a description will be made. In S120, the processor 110 notifies authentication success to the computer 300.

In S125, the computer 300 prepares image data for printing. For example, the user inputs an instruction for selecting images of documents, photos, and so on for printing, an instruction for selecting a sheet size for printing, and an instruction for generating image data for printing the selected images, to an application program operating on the computer 300, such as a word processing program, an image processing program, or an image browsing program. According to these instructions, the computer 300 generates image data for printing. The generated image data has a configuration printable on sheets having the selected sheet size, and includes Q-number of data items representing images of Q-number of pages (wherein Q is an integer of 1 or greater) (hereinafter, an image data item representing an image of one page will be referred to as a page image data item). Also, the generated image data is data having a data format interpretable by the control device 202 of the multifunction device 200. The image data is, for example, image data representing the dot state for print pixels and for toner. The dot state includes, for example, existence or non-existence of dots. Also, the dot state may include existence or non-existence of dots and dot sizes. This image data representing dot state is also referred to as print data. The print data can be generated from the selected image data representing the images selected by the user. For example, the color values (for example, RGB color values) of a plurality of pixels represented by the selected image data are converted into color values represented by color components (here, CMYK) corresponding to the types of color materials usable in printing. Then, a halftone process is performed on the converted color values, whereby the print data is generated. Also, in the present illustrative embodiment, the computer 300 generates the image data such that the images can be printed in a predetermined standard output format. The standard output format may be, for example, an output format in which the item "PRINT QUALITY" is "NORMAL", and the item "COLOR MODE" is "COLOR PRINTING", and the item "PRINT SIDE" is "SINGLE-SIDED PRINTING", and the item "PAGE LAYOUT" is "1 in 1".

In S130, the computer 300 transmits a printing request including the image data for printing, to the server 100. In S135, the processor 110 of the server 100 receives (i.e. obtains) the image data from the computer 300. Uploading of the image data is permitted in the case where authentication of the account information has succeeded. Therefore, it can be said that the printing request from the computer 300 is associated with the account information.

In S140, the processor 110 stores the obtained image data in the storage device 115 (in the present illustrative embodiment, the non-volatile storage device 130). In S145, the processor 110 generates information on the obtained image data, and adds the generated information to the image data table 135 (FIG. 1). Although not shown in the drawings, the image data table 135 represents the correspondence among print IDs, authentication IDs, paths representing image data items, and generation dates and times. Print IDs are identification numbers of processes (also referred to as print jobs) for printing using image data. Whenever an image data is uploaded, the processor 110 assigns a number different from all print IDs included in the image data table 135 to the uploaded image data. Authentication IDs are authentication IDs authenticated to upload image data. Paths represent the storage locations of image data items in the storage device 115 (here, the non-volatile storage device 130). Generation dates and times are updating date and times of image data items.

In S150 of FIG. 3, the processor 110 notifies the computer 300 that uploading of the image data has been completed. Then, the process of FIG. 3 finishes.

Figure 4:
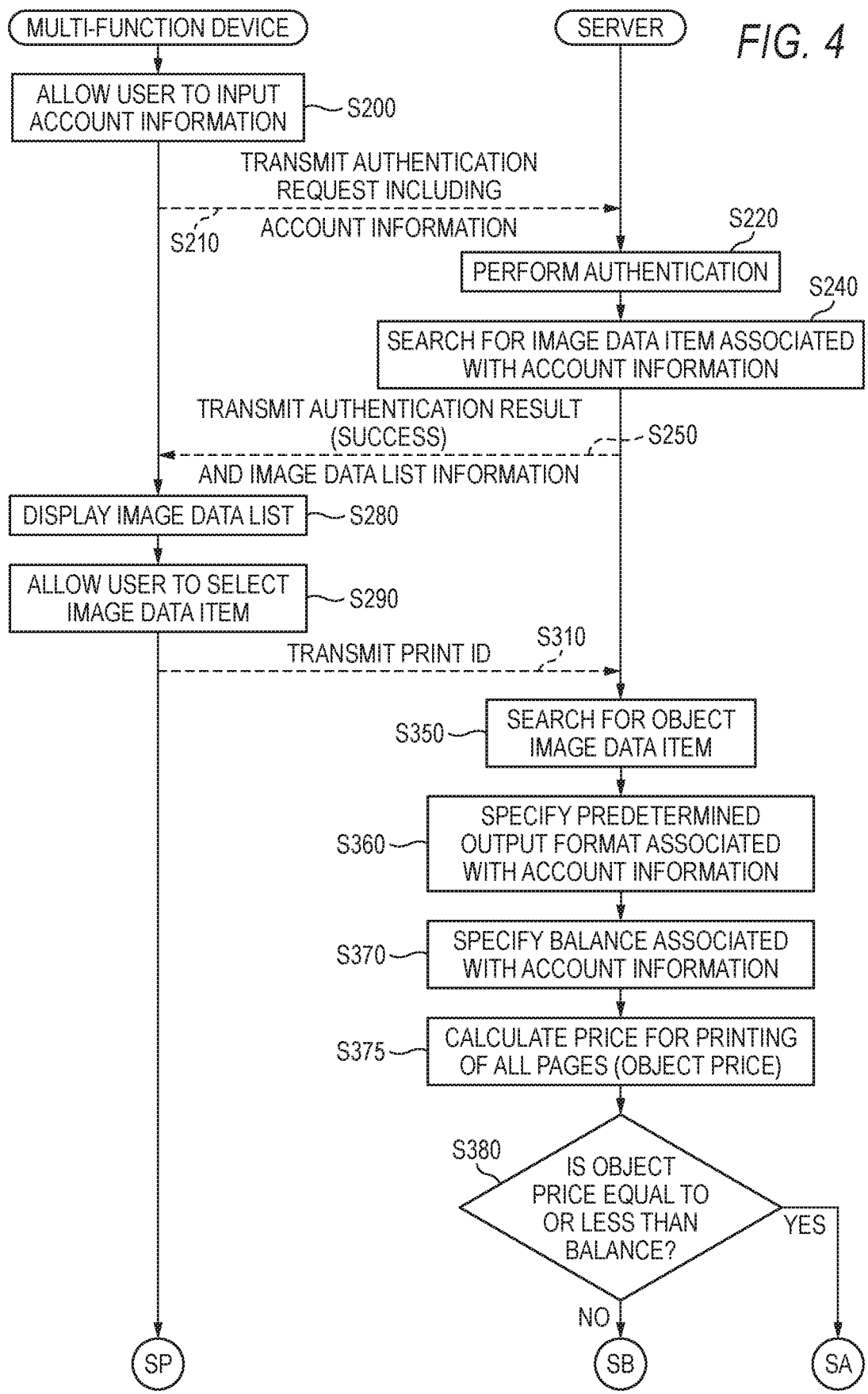
FIG. 4 is a sequence diagram illustrating an example of a process of printing images using image data stored in the server 100.
Figure 5A:
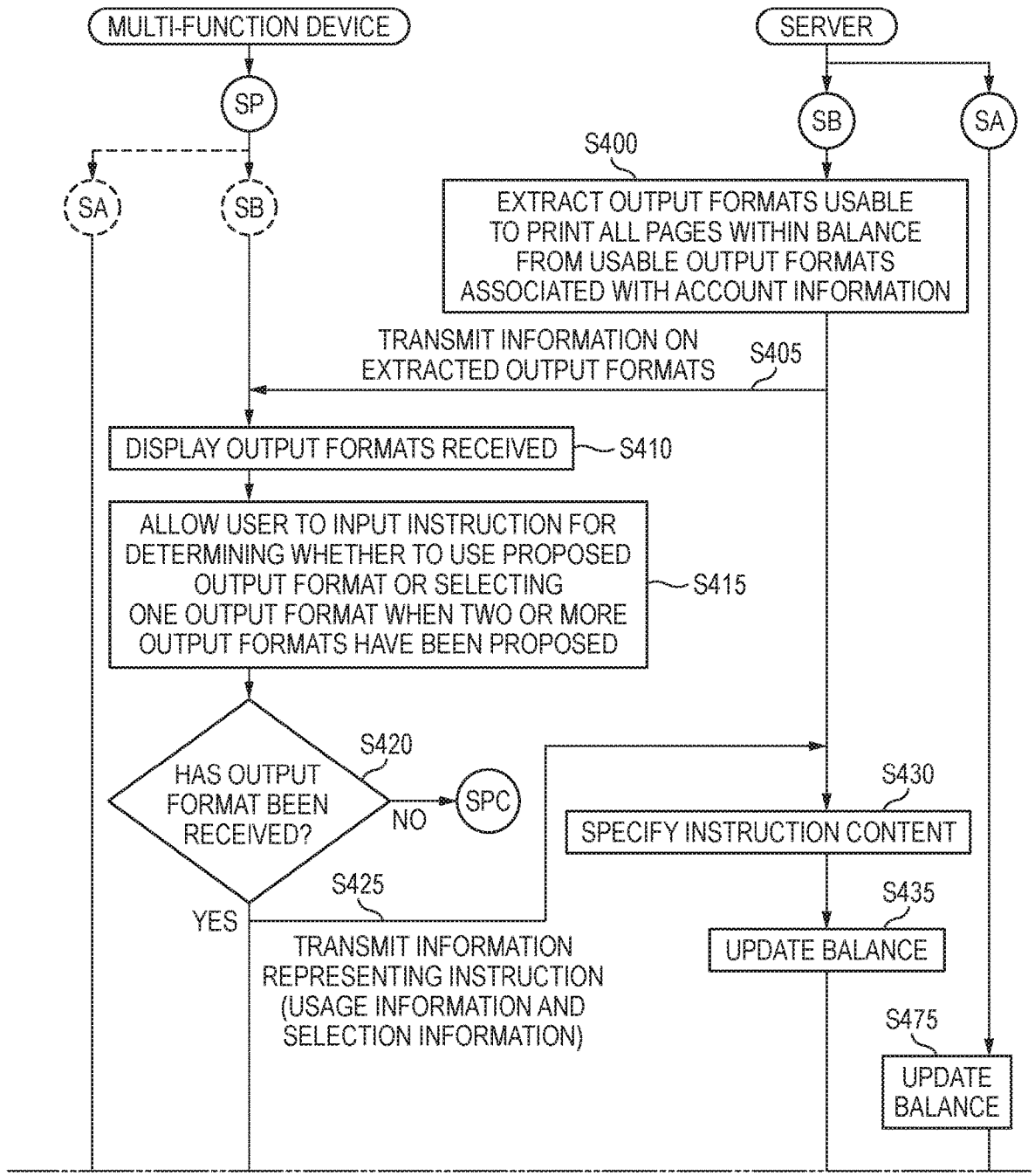
FIGS. 5A and 5B are sequence diagrams illustrating the example of the process of printing images using the image data stored in the server 100.
Figure 5B:
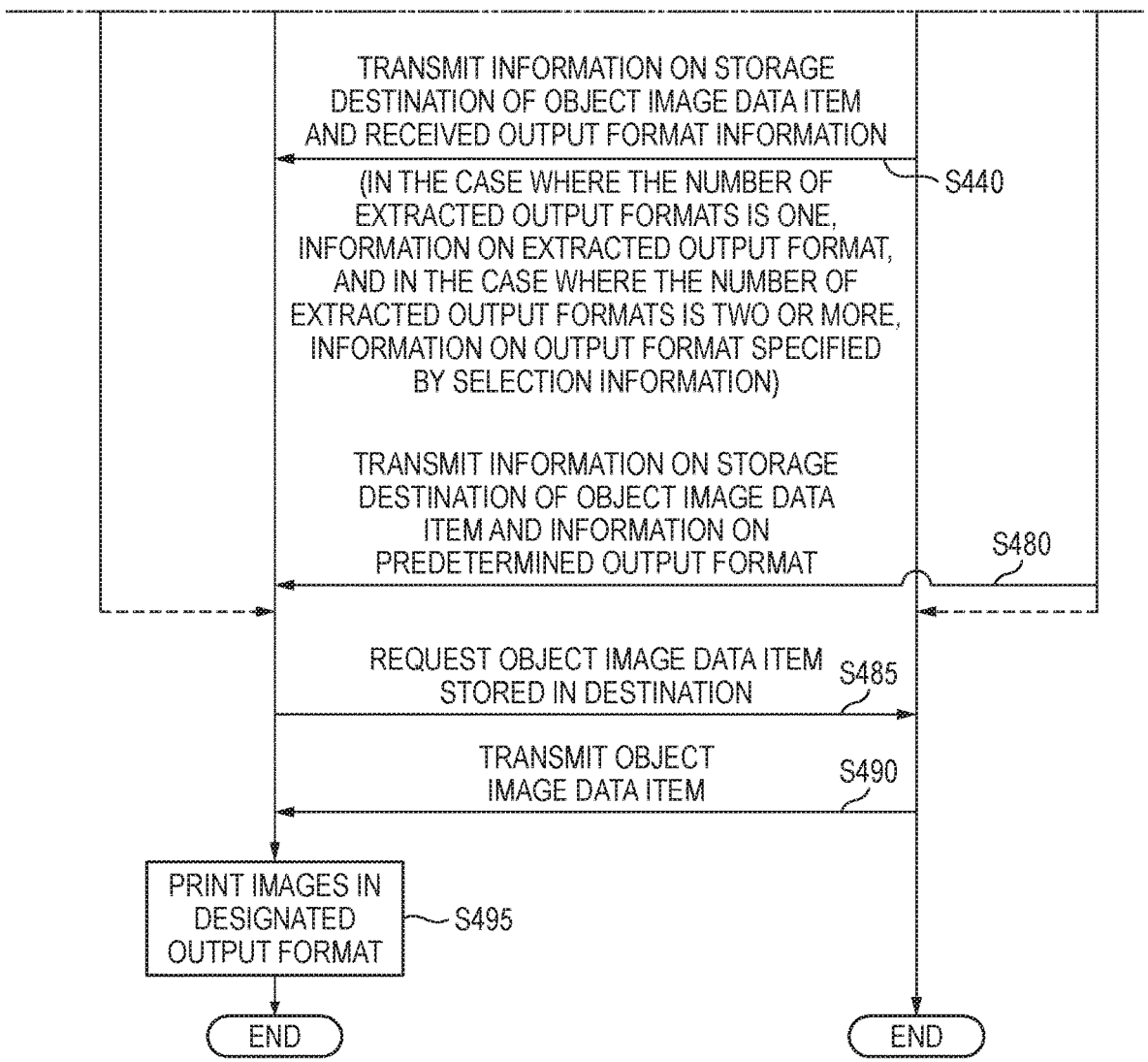
Figure 6:
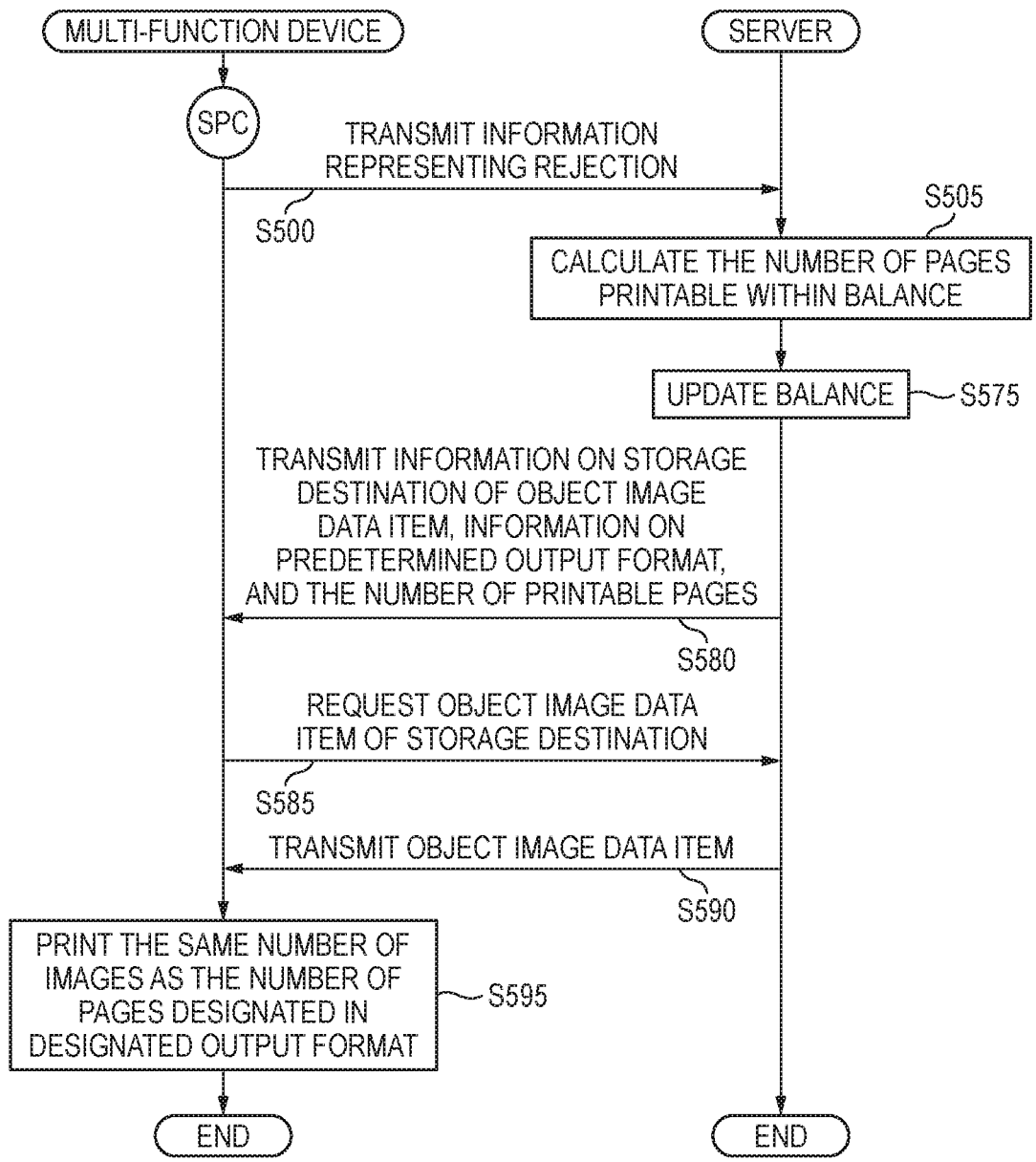
FIG. 6 is a sequence diagram illustrating the example of the process of printing images using the image data stored in the server 100.

FIGS. 4, 5, and 6 are sequence diagrams illustrating an example of a process of printing images using image data stored in the server 100. FIGS. 5A and 5B show the subsequent stage of FIG. 4, and FIG. 6 shows a process branched from FIG. 5A. The user inputs a printing process start instruction by operating the operation unit 250 of the multi-function device 200. As a result, the process shown in FIG. 1 FIGS. 4, 5A, 5B, and 6 starts.

In S200, the user inputs account information (here, an authentication ID) to the multi-function device 200 (FIG. 1). In the present illustrative embodiment, the user has an IC card retaining an authentication ID and a password, and inputs the authentication ID and the password to the multi-function device 200 by bringing the IC card close to the card reader 295 of the multi-function device 200. However, the password may not be recorded in the IC card. In this case, the user may input the password by operating the operation unit 250. Also, the user may input the authentication ID and the password by operating the operation unit 250, without using the IC card.

In S210, the processor 210 of the multi-function device 200 transmits data representing the input authentication ID and the input password, to the server 100. The processor 110 of the server 100 obtains the data representing the authentication ID and the password from the multi-function device 200. In S220, the processor 110 performs authentication on the authentication ID obtained in S210, with reference to the account information table 134 (FIG. 1). This authentication process is identical to S110 of FIG. 3. Hereinafter, on the assumption that authentication has succeeded, a description will be made. Also, if an authentication ID is input to the multi-function device 200 and is authenticated, the authentication ID is also referred to as an object authentication ID. Meanwhile, although not shown in the drawings, if authentication fails, the processor 110 notifies authentication failure to the multi-function device 200, and finishes the process.

In S240, the processor 110 searches for image data associated with the object authentication ID, with reference to the image data table 135 (FIG. 1). In S250, the processor 110 transmits data representing the authentication result (here, success), and data representing a list of image data associated with the object authentication ID, to the multi-function device 200. The image data list represents a list of information (in the present illustrative embodiment, print IDs and generation dates and times) associated with the image data.

In S280, the processor 210 of the multi-function device 200 displays the image data list, using the list obtained from the server, on the display unit 240. In S290, the user inputs an instruction for selecting a desired image data item for printing from the displayed list by operating the operation unit 250. In the present illustrative embodiment, the selected image data item is specified by a print ID. Hereinafter, the print ID representing the selected image data item is also referred to as the selected print ID. In S310, the processor 210 of the multi-function device 200 transmits data representing the selected print ID to the server 100.

In S350, the processor 110 of the server 100 searches for the path of an image data item (also referred to as an object image data item) associated with the selected print ID obtained from the multi-function device 200, with reference to the image data table 135 (FIG. 1).

In S360, the processor 110 specifies a predetermined output format (referred to as an object output format) associated with the object authentication ID, with reference to the output format table 140 (FIGS. 1 and 2C). In S370, the processor 110 specifies a balance (also referred to as an object balance) associated with the object authentication ID, with reference to the usage state table 139 (FIG. 2B). In S375, the processor 110 specifies a sheet size and the number of pages (referred to as an object size and the number of object pages) by analyzing the object image data item. Then, the processor 110 calculates a price (referred to as an object price) for the case of printing all of the object pages on sheets having the object size in the predetermined output format, with reference to the reference price table 138 (see FIGS. 1 and 2A). In S380, the processor 110 determines whether the object price is equal to or less than the object balance, or not.

In the case where the object price is equal to or less than the object balance ("Yes" in S380), in S475 of FIG. 5A, the processor 110 updates the usage state table 139 (FIGS. 1 and 2B) by replacing the balance associated with the object authentication ID with a value obtained by subtracting the object price from the balance (i.e. the object balance). In the present illustrative embodiment, the processor 110 adds the object price to a sum of charged prices, and subtracts the object price from the balance.

In S480 (FIG. 5B), the processor 110 transmits data representing storage destination information representing the storage destination of the object image data item in the server 100 and information representing the predetermined output format, to the multi-function device 200. The storage destination information represents, for example, an URL (Uniform Resource Locator) including the path of the object image data item.

In S485, the processor 210 of the multi-function device 200 requests the server 100 to transmit the object image data item specified by the storage destination information. In S490, in response to the request from the multi-function device 200, the processor 110 of the server 100 transmits the object image data item to the multi-function device 200. In S495, the processor 210 of the multi-function device 200 controls the printing unit 290 (FIG. 1) such that the printer prints images using the object image data item received from the server 100, in the output format (also referred to as the designated format) specified by the information received from the server 100. Then, the process of FIGS. 5A and 5B finishes.

In the case where the designated format is different from the output format associated with the object image data item (in the present illustrative embodiment, the standard output format described with respect to S125 of FIG. 3), the processor 210 adjusts the object image data item such that the object image data item is suitable for the designated format, and controls the printing unit 290 such that the printing unit prints images using the adjusted image data item. For example, in the case where the item "PRINT QUALITY" of the designated format is "TONER SAVING", at least in a partial color range, color values represented by the object image data item are corrected into values representing lighter colors. In the case where the item "COLOR MODE" of the designated format is "MONOCHROME PRINTING", the color values represented by the object image data item are converted into color values of monochrome images. In the case where the item "PAGE LAYOUT" of the designated format is "N in 1", the object image data item is corrected such that N-number of images are assigned to the single page. In the case where the item "PRINT SIDE" of the designated format is "DOUBLE-SIDED PRINTING", the processor 210 controls the printing unit 290 such that the images are printed on both sides of each sheet.

In the case where the object price is more than the balance ("No" in S380 of FIG. 4), in S400 of FIG. 5A, the processor 110 of the server 100 specifies usable output formats associated with the object authentication ID, with reference to the output format table 140 (FIGS. 1 and 2C). For example, in the case where the object authentication ID is the first account information item 141a, the first output format group 141b is specified; whereas in the case where the object authentication ID is the second account information item 142a, the second output format group 142b is specified. Subsequently, with respect to each usable output format, the processor 110 calculates a price for a printing process of printing the images of all pages represented by the object image data item on the basis of the corresponding output format, with reference to the reference price table 138 (FIG. 2A). Then, if a price calculated with respect to an output format is equal to or less than the balance, the processor 110 extracts the corresponding output format. For example, in a case where the item "PRINT SIDE" of the object output format is "SINGLE-SIDED PRINTING", an output format in which the item "PRINT SIDE" is "DOUBLE-SIDED PRINTING" can be extracted. Also, in the case where the item "PAGE LAYOUT" of the object output format is "1 in 1", an output format in which the item "PAGE LAYOUT" is "2 in 1" can be extracted. Also, in S400, a plurality of output formats can be extracted. Hereinafter, extracted output formats are also referred to as candidate output formats.

In S405 (FIG. 5A), the processor 110 transmits data representing output format information representing candidate output formats, to the multi-function device 200. In S410, the processor 210 of the multi-function device 200 displays a candidate output format list represented by the received information, on the display unit 240 (FIG. 1). In S415, the user inputs an instruction for determining whether to use a candidate output format instead of the predetermined output format, by operating the operation unit 250 (FIG. 1). In the case where a plurality of candidate output formats is displayed, the user inputs an instruction for selecting one candidate output format to be used in printing from the plurality of candidate output formats. Also, the processor 210 may display a plurality of options corresponding to a plurality of candidate output formats, and an option representing that any of the displayed output formats will not be used, and make the user select one option from the plurality of options. In this case, it can be said that an instruction for selecting one of the displayed candidate output formats is an instruction for determining to use the displayed candidate output formats and selecting one candidate output format. Hereinafter, if the user determines a candidate output format to be used, the corresponding format is referred to as a substitute output format. In the case where only one candidate output format is extracted, the extracted output format can be determined as a substitute output format. In the case where two or more candidate output formats are extracted, one output format can be selected as a substitute output format by the user.

In S420, the processor 210 determines whether a candidate output format has been received (i.e. whether an instruction for using a candidate output format has been input), with reference to the instruction input by the user. In the case where a candidate output format has been received ("Yes" in S420), in S425, the processor 210 transmits data representing instruction information representing the content of the input instruction, to the server 100. The instruction information which is transmitted represents that a candidate output format should be used. Also, in the case where the number of candidate output formats is two or more, the instruction information which is transmitted represents that one candidate output format (i.e. a substitute output format) selected by the user should be used. As described above, it can be said that information representing one selected candidate output format represents that the corresponding candidate output format should be used. The processor 110 of the server 100 receives data representing the received instruction information, from the multi-function device 200.

In S430, with reference to the information received from the multi-function device 200, the processor 110 of the server 100 specifies that the corresponding information represents that the candidate output format should be used. In this case, the processor 110 specifies the candidate output format (i.e. the substitute output format) to be used, on the basis of the information from the multi-function device 200. In S435, the processor 110 calculates a price for a printing process based on the substitute output format, and updates the usage state table 139 (FIG. 2B) on the basis of the calculated price. Specifically, the processor 110 calculates a price (referred to as a substitute price) for a case of printing images of all pages represented by the object image data item on sheets having the object size in the substitute output format, with reference to the reference price table 138 (FIG. 2A). Then, the processor 110 updates the usage state table 139 by replacing the balance associated with the object authentication ID with a value obtained by subtracting the substitute price from the balance. In S435 of the present illustrative embodiment, similarly in S475, the substitute price is added to the sum of charged prices, and the substitute price is subtracted from the balance.

In S440, the processor 110 transmits data representing the storage destination information representing the storage destination of the object image data item in the server 100 and information representing the substitute output format to the multi-function device 200. In the case where the number of extracted candidate output formats is one, the substitute output format is the extracted one candidate output format. In the case where the number of extracted candidate output formats is two or more, the substitute output format is one candidate output format selected by the user.

S485, S490, and S495 which are subsequently performed are as described above. Also, in S495, the processor 210 of the multi-function device 200 controls the printing unit 290 (FIG. 1) such that the printing unit prints the images in the output format specified by the information received from the server 100 (here, the information representing the substitute output format). Then, the process of FIGS. 5A and 5B finishes.

In the case where the user determines not to use any candidate output format ("No" in S420 of FIG. 5A), in S500 of FIG. 6, the processor 210 of the multi-function device 200 transmits data representing the instruction information representing that every candidate output format has been rejected, to the server 100. The processor 110 of the server 100 receives the corresponding data from the multi-function device 200. With reference to the received instruction information, the processor 110 specifies that the instruction information represents that any candidate output format should not be used. In this case, in S505, with reference to the reference price table 138 (FIG. 2A), the processor 110 of the server 100 calculates the number of pages printable within the balance in the case of printing the images on sheets having the object size in the predetermined output format (referred to as the number of printable pages). In S575, with reference to the reference price table 138 (FIG. 2A), the processor 110 calculates a price for the case of performing a process of printing all of the printable pages on sheets having the object size in the predetermined output format (referred to as an allowable printing price). Then, the processor 110 updates the usage state table 139 by replacing the balance associated with the object authentication ID with a value obtained by subtracting the allowable printing price from the balance. In S575 of the present illustrative embodiment, similarly in S475 of FIG. 5A, the allowable printing price is added to the sum of charged prices, and the allowable printing price is subtracted from the balance.

In S580, the processor 110 transmits data representing information representing the storage destination of the object image data item in the server 100, information representing the predetermined output format, and information representing the number of printable pages, to the multi-function device 200. S585 and S590 are identical to S485 and S490 of FIG. 5B, respectively. In S595, the processor 210 of the multi-function device 200 controls the printing unit 290 (FIG. 1) such that the printing unit prints the same number of images as the number of printable pages, using the object image data item received from the server 100, in the predetermined output format specified by the information received from the server 100. Then, the process of FIGS. 5A and 5B finishes.

As described above, in the present illustrative embodiment, the server 100 (FIG. 1) has the storage device 115. The storage device 115 (specifically, the non-volatile storage device 130 included in the storage device 115) retains information including the reference price table 138 and the usage state table 139. The reference price table 138 (FIG. 2A) represents the correspondence between information items representing output formats for printing processes and information items representing prices for printing processes based on the output formats. Also, the usage state table 139 (FIG. 2B) represents the correspondence between account information items specifying users and information items representing balances of the users.

Also, in S130 of FIG. 3, the processor 110 of the server 100 receives the printing request using the account information. In S370 of FIG. 4, with reference to the usage state table 139 (FIG. 2B), the processor 110 specifies the object balance which is the balance associated with the object authentication ID corresponding to the printing request. In S375, the processor 110 calculates the object price which is the price for the case of performing a printing process based on the printing request according to the object output format corresponding to the printing request. In the present illustrative embodiment, the object output format is the predetermined output format associated with the account information item corresponding to the printing request. In S380, the processor 110 determines whether the object price is equal to or less than the object balance, or not. In the case where it is determined that the object price is equal to or less than the balance ("Yes" in S380), in S475 of FIG. 5A, the processor 110 updates the usage state table 139 (FIG. 2B) such that the balance associated with the object authentication ID becomes the value obtained by subtracting the object price from the object balance (i.e. the balance before updating). In the case where it is determined that the object price is more than the object balance ("No" in S380 of FIG. 4), in S400 of FIG. 5A, with reference to the reference price table 138 (FIG. 2A), the processor 110 extracts the candidate output formats which are output formats usable to perform the printing process based on the printing request within the object balance. Then, in S405, the processor 110 transmits the information representing the extracted candidate output formats to an external device (here, the multi-function device 200) connected to the network NT.

According to this configuration, in the case where the object price is more than the object balance, the server 100 transmits the information representing the candidate output formats usable to perform the printing process within the object balance, to the external device, thereby capable of proposing printing at a price within the object balance.

Also, as described with respect to FIGS. 2A and 2C, each output format includes the item "COLOR MODE" which is information representing one of the options "COLOR PRINTING" and "MONOCHROME PRINTING", the item "PAGE LAYOUT" which is information representing whether to print images of N-number of images (wherein N is an integer of 2 or greater) on a single page, the item "PRINT QUALITY" which is information representing whether to perform printing in a mode for saving the color materials, and the item "PRINT SIDE" which is information representing whether to perform double-sided printing. The server 100 can change the settings of various items as described above, thereby proposing printing at a price within the object balance.

Also, in the case where a plurality of candidate output formats is extracted, in S405 of FIG. 5A, the processor 110 of the server 100 transmits the information representing the plurality of candidate output formats to the external device (here, the multi-function device 200). In S425, the processor 110 of the server 100 receives information representing one output format (also referred to as the selected output format) selected from the plurality of candidate output formats, from the external device. Then, in S440, the processor 110 transmits the information representing the selected output format, to the multi-function device 200 which is the above-mentioned external device. As described above, since the multi-function device 200 receives the information representing one output format selected from the plurality of candidate output formats usable to perform the printing process within the object balance, it is possible to perform printing within the object balance.

Also, in S425 (FIG. 5A) and S500 (FIG. 6), the processor 110 of the server 100 receives information representing whether to use a candidate output format, from the external device (here, the multi-function device 200). Then, in the case where the information from the external device represents that a candidate output format should be used ("Yes" in S420, and S425), in S440, the processor 110 of the server 100 transmits information representing the candidate output format to the multi-function device 200 which is the above-mentioned external device. Meanwhile, in the case where the information from the external device represents that any candidate output format should not be used ("No" in S420, and S500 of FIG. 6), in S580 of FIG. 6, the processor 110 of the server 100 transmits information representing the object output format (in the present illustrative embodiment, the predetermined output format associated with the object authentication ID), and the number of pages printable within the object balance, to the multi-function device 200 which is the above-mentioned external device. As described above, in the case where any candidate output format should not be used, the number of pages is restricted, whereby it is possible to perform printing in the object output format within the balance.

Also, as shown in FIGS. 1 and 2C, the information which is stored in the storage device 115 of the server 100 (specifically, the non-volatile storage device 130 included in the storage device 115) includes the output format table 140. The output format table 140 represents the correspondence between account information items and usable output formats. The correspondence represented by the output format table 140 includes the correspondence between the first account information item 141a and the first output format group 141b, and the correspondence between the second account information item 142a and the second output format group 142b. Further, in S400 of FIG. 5A, the processor 110 extracts candidate output formats from a usable output format group associated with the object authentication ID. For example, in the case where the object authentication ID is the first account information item 141a, a candidate output format is extracted from the first output format group 141b. In the case where the object authentication ID is the second account information item 142a, the second output format group 142b is extracted from the second output format group 142b. Therefore, the server 100 can extract appropriate candidate output formats according to the account information item.

Modifications to Illustrative Embodiments (1) The configuration of information representing the correspondence between account information items and balances may be various configurations, instead of the configuration shown in FIG. 2B. For example, each balance can be calculated from a sum of available money and a sum of charged prices. Therefore, balances may be omitted from the usage state table 139. Even in this case, a combination of a sum of available money and a sum of charged prices represents a balance. Alternatively, from the usage state table 139, the sums of available money and the sums of charged prices may be omitted. Also, the usage state table 139 may represent combinations of sums of available money and the ratios of balances in the sums of available money. Also, a group including a plurality of account information items may be associated with one balance. Further, the usage state table 139 may represent the correspondence between each of a plurality of groups and a balance. For example, a sales department of a company may be associated with a balance for the sales department, and a development department may be associated with a balance for the development department. Even in a case, it can be said that each of a plurality of account information items included in one group is associated with a balance associated with the corresponding group. For example, a plurality of member of a sales department of a company may be associated with a balance for the sales department, and a plurality of members of a development department may be associated with a balance for the development department. In this case, if a member of the sales department performs a printing process, the balance for the sales department decreases.

(2) The configuration of information representing the correspondence between account information items and usable output formats may be various configurations, instead of the configuration shown in FIG. 2C. For example, a group including a plurality of account information items may be associated with a set of usable output formats. Further, the output format table 140 may represent the correspondence between each of a plurality of groups and a set of usable output formats. For example, the output format table may be set such that members of a sales department of a company can use "COLOR PRINTING" but members of a development department cannot use "COLOR PRINTING". Even in this case, it can be said that each of a plurality of account information items included in one group is associated with usable output formats associated with the corresponding group.

(3) Output format options may be various other options, instead of the plurality of options described with respect to FIGS. 2A and 2C. For example, the item "PRINT QUALITY" may have two options "NORMAL" and "TONER SAVING". Also, selectable items of output formats are not limited to the items "SHEET SIZE", PRINT QUALITY", "COLOR MODE", "PRINT SIDE", and "PAGE LAYOUT", and may include arbitrary items. For example, an item "SHEET TYPE" may be selected from options "PLAIN PAPER" and "PHOTO PAPER". In general, each output format may include at least one of information representing one of "COLOR PRINTING" and "MONOCHROME PRINTING", information representing whether to print images of N-number of pages (wherein N is an integer of 2 or greater) on a single page, information representing whether to perform printing in the mode for saving the color materials, and information representing whether to perform double-sided printing. However, output formats may not include the above-mentioned items, and may include other items.

(4) Information representing correspondence to be used in printing processes, like the tables 138, 139, and 140 shown in FIGS. 2A to 2C may be stored in an arbitrary storage device installed in the server 100. For example, these information may be stored in the volatile storage device 120 included in the storage device 115.

(5) Instead of the process described with reference to FIGS. 3 to 6, various other processes may be performed as a process for printing. For example, in the case where the processor 110 of the server 100 receives information representing that any candidate output format should not be used (for example, S500 of FIG. 6), it may stop the printing process. Also, in the case where the object price is more than the object balance ("No" in S380 of FIG. 4), rejection of use of candidate output formats may be prohibited. In this case, printing in the object output format restricting the number of pages is not performed, and printing in a candidate output format is performed. Also, priorities may be assigned to a plurality of output formats in advance, respectively. Then, in the case where the plurality of output formats is extracted in S400 of FIG. 5A, the processor 110 may use one output format having the highest priority as a candidate output format.

Also, the output format corresponding to the printing request may not be the predetermined output format associated with the object authentication ID, and may be various other output formats. For example, in S125 of FIG. 3, the user may input an instruction for designating an output format, to the computer 300. The computer 300 generates image data such that the images can be printed in the designated output format. Then, the computer 300 transmits a printing request including information representing the designated output format, to the server 100. In S145, the processor 110 of the server 100 adds the information representing the output format corresponding to the printing request, to the image data table 135. In the processes of FIGS. 4 to 6 using the predetermined output format (for example, S375 of FIG. 4, S480 of FIG. 5B, and S505 and S580 of FIG. 6), the processor 110 of the server 100 performs the processes using the output format specified by the information included in the printing request, instead of the predetermined output format.

Also, the processes of updating the balance represented by the usage state table 139 (FIG. 2B) (S435 and S475 of FIG. 5A, and S575 of FIG. 6) may be performed at certain timings after an output format to be used in the printing process is determined. For example, the processor 110 of the server 100 may update the balance if receiving the print completion notification from the multi-function device 200.

Also, in the above-described illustrative embodiment, in S495 of FIG. 5B, the processor 210 of the multi-function device 200 adjusts the object image data item such that the object image data item is suitable for the output format. Alternatively, the processor 110 of the server 100 may adjust the object image data item such that the object image data item is suitable for the output format. For example, before S440 of FIG. 5B, the processor 110 may adjust the object image data item such that the object image data item is suitable for the output format.

Also, the destination to which the server 100 transmits the information representing the candidate output formats in S405 of FIG. 5A may not be a printer (for example, the multi-function device 200) to print the images, and may be a certain external device other than printers. For example, the processor 110 of the server 100 may transmit the information representing the candidate output formats to an information terminal such as a smart phone through the network NT. In this case, the processor 110 may receive information representing whether to use a candidate output format, and information representing a selected output format which is one output format selected from the plurality of candidate output formats, from the corresponding information terminal. The user may determine whether to use a candidate output format, and select one candidate output format from the plurality of candidate output formats, by operating the information terminal. Also, it is preferable to associate an external device which is the destination with the object authentication ID in advance. Also, the printing request which is transmitted in S130 of FIG. 3 may include information specifying an external device.

Also, in S250 of FIG. 4, regardless of the authenticated authentication ID, a list of all image data items stored in the storage device 115 of the server 100 (for example, the volatile storage device 120 or the non-volatile storage device 130) may be transmitted to the multi-function device 200. Also, authentication using the account information may be omitted.

Even in these cases, in the case where it is determined that the object price is equal to or less than the object balance, it is preferable that the processor 110 of the server 100 transmit the object image data item and the information representing the output format corresponding to the printing request to a printer. If the printer receives the information, it can appropriately print images.

(6) Image data which can be uploaded into the server 100 may not be print data, and may be other image data having certain data formats. For example, a bitmap format such as a JPEG format may be used, and a data format described in a page description language like an EMF (Enhanced Meta File) format may be used, and a dedicated data format for a specific application may be used. In general, it is preferable to use a data format usable in the printer. According to this configuration, the processor 110 of the server 100 can use input image data which is uploaded image data, without changes, as image data to be transmitted to the printer. Also, the processor 110 of the server 100 may use the uploaded input image data to generate image data to be transmitted to the printer. For example, the processor 110 of the server 100 may generate image data to be transmitted to the printer by performing image processing using the uploaded input image data, and store the generated image data in the storage device 115.

(7) The configuration of the printer may not be the configuration of the multi-function device 200 of FIG. 1, and may be various configurations capable of printing images using image data received from the server. For example, at least one of the scanner unit 280 and the card reader 295 may be omitted.

(8) The configuration of the server which transmits image data to the printer may not be the configuration of the server 100 of FIG. 1, and may be various other configurations. For example, a plurality of devices (for example, computers) capable of communication with one another through the network may share the function of performing the process for printing, thereby providing the function of the server as a whole (a system having these devices corresponding to the server).

In the above-described illustrative embodiment, some of components implemented by hardware may be replaced by software, and conversely, some or all of components implemented by software may be replaced by hardware. For example, the function of S400 of FIG. 5A may be implemented by a dedicated hardware circuit.

Also, in a case where some or all of the functions of the present invention are implemented by a computer program, this program can be stored in a computer-readable recording medium (for example, a recording medium which is not temporary) to be provided. The program can be used in a state where the program is contained on the supplied recording medium or any other recording medium (a computer-readable recording medium). Examples of computer-readable recording media include not only portable recording media such as memory cards and CD-ROMs, but also internal storage devices such as various ROMs installed in computers, and external storage devices such as hard disk drives connected to computers.

Until now, the present invention has been described on the basis of the illustrative embodiment and the examples. The illustrative embodiment of the present invention has been provided for the purpose of helping better understanding of the present invention, and do not limit the scope of the present invention. The present invention can be modified and changed without departing from the scope of the present invention and the scope of claims, and also includes equivalents thereof.

What is claimed is:

1. A server connectable to a network, the server comprising:
   memory storing management information, the management information comprising:
      first correspondence information representing correspondence between an information item representing an output format for printing process and an information item representing price for the printing process based on the output format, the output format being at least one of (1) information representing whether to print images of N-number of pages on a single page, wherein N is an integer of 2 or greater and (2) information representing whether to perform double-sided printing; and
      second correspondence information representing correspondence between an account information item specifying a user and an information item representing a balance, the balance being a maximum amount of money spendable by the specified user; and
   a controller configured to perform:
      receiving a printing request using an account information item;
      determining whether an object price is equal to or less than an object balance, the object price being a price for performing a printing process with a single, specific printer based on the printing request according to an object output format specified by the user corresponding to the printing request, the object balance being the balance included in the second correspondence information in association with an object account information item corresponding to the printing request;
      in a case where it is determined that the object price is equal to or less than the object balance, updating the second correspondence information such that the balance associated with the object account information item represents a value obtained by subtracting the object price from the object balance; and
      in a case where it is determined that the object price is more than the object balance, extracting candidate output format executable by the single, specific printer with reference to the first correspondence information and transmitting, to an external device connected to the network, information representing the extracted candidate output format for performing the printing process, the external device being the single, specific printer, a price of the extracted candidate output format being less than a price of the object output format specified by the user and being usable to perform a printing process based on the printing request within the object balance, the extracted candidate output format being at least one of (1) printing images of N-number of pages on a single page in a case where the object output format specified by the user is printing images of N-number of pages on N-number of pages and (2) performing double-sided printing in a case where the object output format specified by the user is performing single-sided printing, and
   wherein in a case where a plurality of candidate output formats executable by the single, specific printer are extracted when performing the extracting, the transmitting of the information representing the extracted candidate output format is performed by transmitting, to the external device, information representing the plurality of candidate output formats, and the controller is configured to further perform receiving, from the external device, a selection of the user of one of the plurality of candidate output formats.

2. The server according to claim 1, wherein the output format further comprises at least one of:
   information representing any one of color printing and monochrome printing; or
   information representing whether to perform printing in a mode for saving color material.

3. The server according to claim 1, wherein the controller is configured to further perform:
   receiving, from the external device, usage information representing whether to use a candidate output format represented by the information transmitted when performing the transmitting of the information representing the extracted candidate output format;
   in a case where the usage information represents that the candidate output format is to be used, transmitting, to the external device information representing the candidate output format.

4. The server according to claim 1, wherein the controller is configured to further perform:
   receiving, from the external device, usage information representing whether to use a candidate output format represented by the information transmitted when performing the transmitting of the information representing the extracted candidate output format;
   in a case where the usage information represents that any candidate output format is not be used, transmitting, to the external device information representing the object output format and the number of pages printable within the object balance.

5. The server according to claim 1,
   wherein the management information comprises third correspondence information representing correspondence between the account information item and usable output format,
   wherein the third correspondence information comprises correspondence between a first account information item and a first output format group and correspondence between a second account information item and a second output format group,
   wherein in a case where the object account information item is the first account information item, the extracting is performed by extracting candidate output formats from the first output format group, and
   wherein in a case where the object account information item is the second account information item, the extracting is performed by extracting candidate output formats from the second output format group.

6. The server according to claim 1, wherein in the case where it is determined that the object price is more than the object balance, also transmitting to the external device information representing the extracted candidate output format selected by the user.

7. The server according to claim 6, wherein the external device performs a printing process based on the extracted candidate output format selected by the user.

8. A non-transitory computer-readable recording medium storing computer-readable instructions for a computer connectable to a network comprising:
a server connectable to the network, the server comprising memory, the memory storing management information comprising:
first correspondence information representing correspondence between an information item representing an output format for printing process and an information item representing price for the printing process based on the output format, the output format being at least one of (1) information representing whether to print images of N-number of pages on a single page, wherein N is an integer of 2 or greater and (2) information representing whether to perform double-sided printing; and
second correspondence information representing correspondence between an account information item specifying a user and an information item representing a balance, the balance being a maximum amount of money spendable by the specified user, the computer-readable instructions, when executed by a processor of the computer, causing the computer to perform:
receiving a printing request using an account information item;
determining whether an object price is equal to or less than an object balance, the object price being a price for performing a printing process with a single, specific printer based on the printing request according to an object output format specified by the user corresponding to the printing request, the object balance being the balance included in the second correspondence information in association with an object account information item corresponding to the printing request;
in a case where it is determined that the object price is equal to or less than the object balance, updating the second correspondence information such that the balance associated with the object account information item represents a value obtained by subtracting the object price from the object balance; and
in a case where it is determined that the object price is more than the object balance, extracting candidate output format executable by the single, specific printer with reference to the first correspondence information and transmitting, to an external device connected to the network, information representing the extracted candidate output format for performing the printing process, the external device being the single, specific printer, a price of the extracted candidate output format being less than a price of the object output format specified by the user and being usable to perform a printing process based on the printing request within the object balance, the extracted candidate output format being at least one of (1) printing images of N-number of pages on a single page in a case where the object output format specified by the user is printing images of N-number of pages on N-number of pages and (2) performing double-sided printing in a case where the object output format specified by the user is performing single-sided printing, and
wherein in a case where a plurality of candidate output formats executable by the single, specific printer are extracted when performing the extracting, the transmitting of the information representing the extracted candidate output format is performed by transmitting, to the external device, information representing the plurality of candidate output formats, and the controller is configured to further perform receiving, from the external device, a selection of the user of one of the plurality of candidate output formats.

9. The non-transitory computer-readable recording medium of claim 8, wherein in the case where it is determined that the object price is more than the object balance, also transmitting to the external device information representing the extracted candidate output format selected by the user.

10. The non-transitory computer-readable recording medium of claim 9, wherein the external device performs a printing process based on the extracted candidate output format selected by the user.

* * * * *